Aug. 31, 1954  E. J. McLEARY  2,687,998
WATER AERATING AND FILTERING DEVICE
Filed Sept. 18, 1951
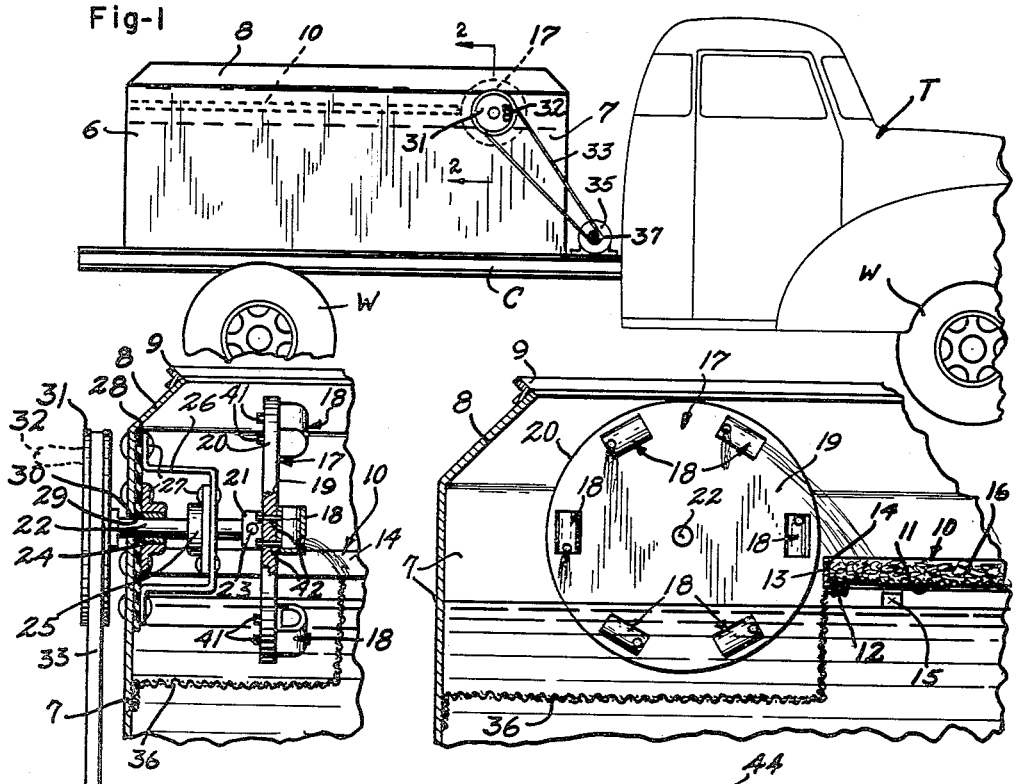
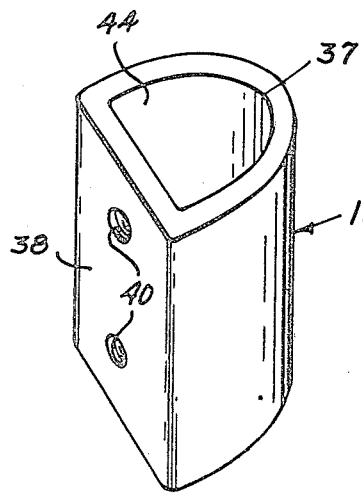
Edward J. McLeary
INVENTOR.
BY Glenn L. Fish
Atty.

Patented Aug. 31, 1954

2,687,998

UNITED STATES PATENT OFFICE 2,687,998

WATER AERATING AND FILTERING DEVICE

Edward J. McLeary, Soap Lake, Wash.

Application September 18, 1951, Serial No. 247,177

1 Claim. (Cl. 210—16)

My present invention is a device for aerating water containing marine life.

An object of the invention lies in the provision of a device adapted to aerate and filter bodies of water for containing live fish or other marine life and thus greatly increase the time one may permit the contents to stay in a body of water not having a fresh water inlet.

Another object of the invention lies in the provision of a water aerator and filter particularly adapted for use on tanks for transportation of marine life and which has no water connections below the water line, thus greatly reducing the cost of maintenance from leaks forming in the tank about connections below the water level.

Another object of the invention lies in the provision of a water aerator and filter which may be applied to stationary aquaria, pools, tanks and the like and which by reason of its having no pipes or plumbing may utilize a filter of any size not to exceed the area of the surface of the water contained therein.

Another object of the invention lies in the provision of a water aerator and filter which adequately performs its intended function with the use of a relatively small power source and which is so constructed that in the event of a power failure, the device may be manually operated to preclude the loss of life contained therein.

Another object of the invention lies in the provision of a water aerator and filter which will not be liable to become stopped up while in use and thus eliminates the danger of losing the life served thereby.

Another object of the invention lies in the provision of a water aerator and filter which is inexpensive to manufacture, easy to install and operate and which is not liable to break down by reason of its few parts and simplicity of construction.

In the drawings, forming a part of this specification, and in which like numerals are employed to designate like parts, Figure 1 is a side elevation of a tank carrying truck having my invention applied thereto, Figure 2 is a fragmentary vertical cross section taken transversely as at line 2—2 of Figure 1, Figure 3 is a fragmentary vertical cross section taken longitudinally of the tank, Figure 4 is a perspective view upon an enlarged scale showing one of the multiple cups, and, Figure 5 is a vertical enlarged cross section taken through one of the cups.

Referring now more particularly to the drawing, I have shown a truck T having front and rear wheels W—W and a frame or chassis C. A metal tank 6 is supported upon the chassis C and has the usual bottom and four side walls 7. The upper marginal edge portions 8 of walls 7 are disposed inwardly at an upward incline, to prevent water from splashing out of the tank, and a reinforcing angle 9 is secured to the upper face of inclined portion 8 at its free edge.

Within the tank and above the usual water level, I have provided a filter 10 which comprises a rectangular frame having a wire mesh bottom 11 supported on an inwardly disposed flange 12 of an angle 13 having its second flange 14 disposed upwardly and forming side walls for the frame or tray. The filter 10 is removably supported in the tank by any desired means such as spaced brackets 15 welded on the inner face of the tank and extending inwardly under the flange 12. The frame is then filled with charcoal 16 or other suitable filtering material and water passing through the filter drips back into the tank and is cleaned and purified.

To aerate the water, I have provided a rotatable wheel 17 with multiple cups 18 circumferentially spaced about the wheel on its face 19 adjacent the arcuate edge 20. The wheel 17 is provided with a centric collar 21 on its rear face and the collar and wheel are drilled to receive shaft 22. Set bolts 23 anchor the wheel on the shaft by gripping the shaft when threaded through said collar.

Shaft 22 is rotatably carried in spaced bearings 24 and 25 carried respectively in axial alignment by a side wall 7 of the tank and a bracket 26 secured to the tank or container wall. The bracket and bearings are each secured to their relative supports by means of rivets or bolts 27, and a rubber seal or gasket 28 is positioned in face to face engagement with the inner face of the side wall 7 supporting the bearing 24 and bracket 26 and their securing bolts or rivets 27 pass through the gasket to form a waterproof seal. An aperture 29 is formed in the gasket to permit shaft 22 to rotatably pass through and the aperture is again of such close diameter to the shaft so as to prevent water from leaking about the shaft.

Side wall 7 is apertured at 30 to allow shaft 22 to pass through and extend outside of the container 6. A relatively large pulley 31 is secured on its outer end and has a foldable handle 32 provided for manual operation when found necessary. Pulley 31 is provided with a peripheral groove for receiving a V-belt 33 trained thereabout and also about a smaller pulley 34 on the shaft of a small electric motor 35 carried by the chassis C. The motor is driven from the electrical system of the truck and I have found the aerator is most effective when the wheel 17 is rotated at approximately 90 R. P. M. However, other speeds are effective.

To protect the fish or other marine life and prevent any damaging debris from contacting the revolving wheel and cups 18, a wire screen 36 is provided between the tank walls 7 and the filter 10 about the portion of the wheel 17 which is below the water level.

Examination of Figures 4 and 5 will reveal that the cups 18 are each cast with arcuate or semi-circular front walls 37, flat rear wall 38 and a bottom wall 39. Vertically spaced and internally threaded sockets 40 are provided in the rear wall 38 and bolts 41 pass through apertures 42 in wheel 17 and are threaded into sockets 40 to mount the cups on the wheel. Each cup has a discharge port 43 in the front wall 37 adjacent the bottom wall 39, and when the wheel is rotated clockwise as viewed in Figure 3, water is sprayed from these ports and falls either into the filter or directly into the container, thus aerating the water so sprayed.

A portion of the water is thrown from the mouth or open top 44 of the cup, onto the filter, and it passes through the filter and drips again into the container 6. The size of the cups required is, of course, dependent upon the volume of water in the container and the amount of marine life requiring aerated water. The greater the quantity of life requiring oxygen, the larger the volume of water necessary to be handled by the device. The volume handled may be varied by increasing or decreasing the speed of rotation of the wheel 17, or by changing the size of the cups 18.

It will be understood that even though I have shown and described my invention relating to a transport tank, it is equally applicable to pools, stationary aquaria and the like.

Having thus described my invention, I claim:

In a container for live fish a device for aerating and filtering the water comprising a filter in the container above the water level, a vertically disposed wheel rotatably supported adjacent the filter and with its lower portion submerged in the water, circumferentially spaced cups on the face of said wheel adjacent its peripheral edge, each said cup having a flat rear wall provided with vertically spaced threaded sockets, a bottom wall, an arcuate front wall having a discharge part for spraying water lifted by the cup, apertures in said wheel, securing bolts passing through said apertures and threaded into said sockets, said cups being adapted to throw a portion of the water lifted into said filter, and means for rotating said wheel.

References Cited in the file of this patent

UNITED STATES PATENTS

| Number | Name | Date |
|---|---|---|
| 216,961 | Jouet | July 1, 1879 |
| 1,055,082 | Rogers | Mar. 4, 1913 |
| 1,227,732 | Zistel | May 29, 1917 |
| 1,971,796 | Scott | Aug. 28, 1934 |
| 1,985,854 | Downes | Dec. 25, 1934 |
| 2,137,397 | Haldeman | Nov. 22, 1938 |
| 2,275,428 | Haldeman | Mar. 10, 1942 |
| 2,628,447 | Brown | Feb. 17, 1953 |

FOREIGN PATENTS

| Number | Country | Date |
|---|---|---|
| 471,715 | Germany | Mar. 16, 1926 |